March 29, 1966  E. BRICHARD  3,243,277
PROCESS AND DEVICE FOR IMPROVING THE THERMAL
UNIFORMITY OF MOLTEN GLASS
Filed June 22, 1962  3 Sheets-Sheet 1

INVENTOR
EDGARD BRICHARD

BY *John J. Hart*
ATTORNEY

March 29, 1966  E. BRICHARD  3,243,277
PROCESS AND DEVICE FOR IMPROVING THE THERMAL
UNIFORMITY OF MOLTEN GLASS
Filed June 22, 1962  3 Sheets-Sheet 2

INVENTOR
EDGARD BRICHARD

BY *John J. Hart*

ATTORNEY

INVENTOR
EDGARD BRICHARD
BY John F. Hart
ATTORNEY

United States Patent Office 3,243,277
Patented Mar. 29, 1966

3,243,277
PROCESS AND DEVICE FOR IMPROVING THE THERMAL UNIFORMITY OF MOLTEN GLASS
Edgard Brichard, Jumet, Belgium, assignor to S. A. Glaverbel, Brussels, Belgium, a company of Belgium
Filed June 22, 1962, Ser. No. 204,495
Claims priority, application Belgium, July 5, 1961, 482,511, Patent 605,754
4 Claims. (Cl. 65—137)

The present invention is concerned with the melting of glass and particularly with conditioning and rendering uniform the temperature of the said glass during its travel between the melting furnace and the working compartment.

The melting of the raw materials requires a temperature much greater than that which the glass is to have when it is to be worked, and therefore it is necessary to cool it before it reaches the point where it is to be used. This cooling is generally carried out in a natural manner by passing the molten glass slowly through a communicating duct connecting the melting zone to the working zone. Now, during this travel, the glass flowing along the walls of the communicating duct cools more rapidly than the central glass which is not subjected to the cooling action of the said walls. The result is the establishment of a considerable temperature gradient across the flow of molten glass, and this gradient is detrimental to good manufacture, especially in the case where the glass is to be drawn in sheet form.

Indeed, since the drawing line is situated transversely of the flow of molten glass, the temperature gradient which forms across the flow during the travel of the glass continues to be present in the sheet being formed. The central portion of the drawn sheet, therefore, has a higher temperature than the edges of the sheet, with the result that there are excessive tensions in the finished product which may cause warping of the sheet.

Various processes have been recommended for reducing the transverse temperature gradient of the glass in the communicating duct, more especially by raising the height of the floor of the said duct along its longitudinal axis and depressing the roof parallel to the raising of the floor, a cooling system being incorporated in the central portion of the roof.

In this way, the central glass flows more slowly than the glass near the walls and is subjected to stronger cooling than the latter, but at the same time two parallel contignuous currents are formed in each of which a transverse temperature gradient becomes established.

It has also been attempted to blow a cooling fluid into the atmosphere of the communicating duct, but this latter process does not make it possible to regulate the cooling action at a specific portion of the glass bath.

In the process according to the present invention for improving the thermal uniformity of glass in the duct bringing glass from the melting furnace to the working compartment, there is created in the roof of the said duct a transverse temperature gradient the general pattern of which is the opposite of the transverse temperature gradient which tends to be established naturally in the glass flow coming from the melting zone.

At the entrance to the duct, substantially no transverse temperature gradient is observed in the glass flow, but such a gradient gradually becomes established under the cooling action of the walls of the vertical sides of the duct and in proportion as the glass passes along the duct when the said duct is provided with an ordinary roof. Now, since the glass loses a considerable proportion of its heat by radiation towards the roof, the gradient created artificially in the roof has the result on the one hand of accelerating the exchange of heat between the central glass and the corresponding portion of the roof and, on the other hand, of retarding the exchange of heat between the glass adjacent the vertical sides of the duct and the lateral portions of the roof. An appropriate choice of the transverse temperature gradient in the roof permits the latter to draw an increasing amount of heat from the glass in proportion as the glass is further away from the vertical duct sides so that, at every point on a line transversely of the flow of glass, the sum total of the heat lost by exchange with the walls and the heat lost by radiation towards the roof is kept at the same value.

A device suitable for carrying the process according to the invention into effect comprises at least one element having a regulatable cooling effect which is arranged transversely of the communicating duct connecting the melting furnace to the glass working compartment, and acts on the central portion of the roof of this duct in such a manner that the cooling of the roof diminishes from the central portion towards the lateral portions.

The cooling element may be arranged above the roof or above an aperture formed in the central portion of the roof. In this latter case, a refractory shield is advantageously interposed between the cooling element and the aperture in the roof. This shield is provided with an aperture serving as a diaphragm, the dimensions and form of which determine the effect of the cooling element. Advantageously, the aperture in the shield is in the form of a lozenge whose major diagonal is arranged transversely with respect to the axis of the duct and the smaller diagonal in the direction of the said axis.

The cooling element is preferably a box adapted to be traversed by a cooling fluid. For this purpose, the box is provided with a pipe introducing this fluid into the middle of the box and, at each of its ends, with a pipe for discharging the fluid. It may be advantageous to provide on the fluid discharge pipes branch pipes debouching within the furnace between the roof and the surface of the glass. In this way, the fluid heated upon passing through the box, preferably a gaseous fluid, can be introduced into the communicating duct in order to increase the atmospheric pressure prevailing in the duct and to stop the gases charged with vapours of volatilised substances coming from the melting furnace.

In a second form of embodiment of the invention, the cooling element situated on the diaphragm is constituted by a plate made of a material which is a good conductor of heat, adapted to be cooled by jets of cooling fluid. This plate can be provided with fins or any other kind of element capable of dissipating heat.

If, for any reason, it is preferred not to form an aperture in the roof of the communicating duct, it is possible to arrange on the roof itself a cooling box which is capable of being traversed by a cooling fluid and has a convex undersurface matching the curvature of the upper surface of the roof. In horizontal section, this box will advantageously be shaped similarly to the shield interposed as explained hereinafter between the aperture of the roof and the rectangular-section box.

In another form of embodiment, the cooling element is arranged below the roof and comprises preferably a pipe which extends transversely across the communicating duct, and is fixed in the vertical duct sides and comprises openings directed towards the central portion of the roof, this pipe being adapted to be traversed by a cooling fluid. It comprises two concentric tubes the external of which is fixed and the internal can rotate about its axis. The two tubes have openings which are in alignment with one another; the openings in one tube are of substantially the same cross-section as one another, whereas the other tube has at least one opening whose width diminishes from the centre towards the vertical sides of the communicating duct. By rotating the mobile tube, the delivery effected at the various regions of the pipe can thus be regulated optionally, this delivery being greatest in the middle of the duct and diminishing towards the vertical sides.

The cooling fluid may be a liquid such as water, but it is preferably a gas, particularly air, the rate of flow and pressure of which can be adjusted.

The effect of the cooling apparatus according to the invention can be increased by covering the upper surface of the roof with heat-insulating elements the thickness of which diminishes from the lateral portions to the central portion of the roof.

Several forms of embodiment of the invention are illustrated by way of example in the accompanying drawings.

Figure 1:
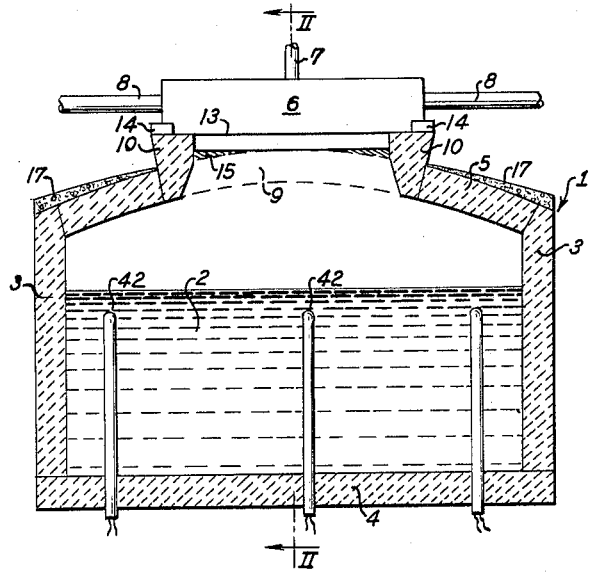
FIGURE 1 is a cross-section of a communicating duct equipped with an apparatus constructed according to the present invention.
Figure 2:
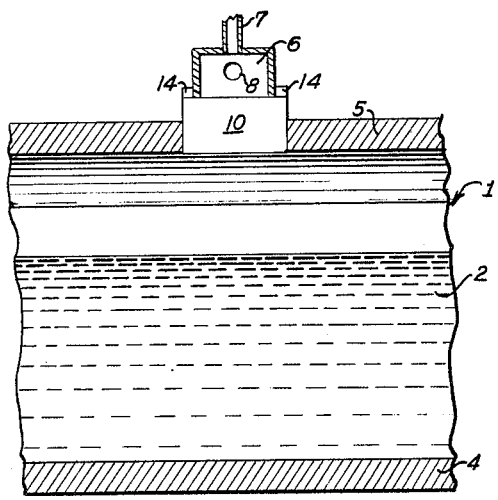
FIGURE 2 is a longitudinal sectional view taken on the line II—II of FIGURE 1.

FIGURES 1 and 2 show a communicating duct 1 along which flows the molten glass 2 travelling from the melting furnace to the working compartment. The communicating duct is bounded by the vertical sides 3, the floor 4 and the roof 5.

According to the invention, a metallic box 6 comprises an inlet pipe 7 for the entry of cooling fluid, this pipe being connected to the middle of the upper face of the said box, and two discharge pipes 8 situated laterally. The box 6 is arranged above a rectangular aperture 9 formed in the roof 5 perpendicularly to the axis of the duct 1. The aperture 9 can be formed by two buffer bricks 10 (FIGURES 1 and 3) whose ends are inserted in the normal roof bricks 11, and support the rows of bricks 12 which are interrupted by the aperture 9. The buffer bricks 10 which support the ends of the box 6 are higher than the normal bricks of the roof 5, so as to form between the said roof and the bottom of the box 6 a slot 13. They also comprise ledges 14 against which the box 6 is fitted and is thus held in position. In order to obtain a slot 13 having rectilinear and parallel edges, a layer 15 of refractory material having a horizontal surface is arranged on the bricks bounding the aperture 9.

Figure 4:
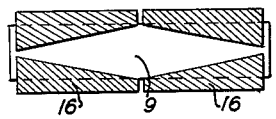

The slot 13 is intended to receive slabs 16 (FIGURE 4) made of refractory material which are slipped into the said slot and act as a diaphragm. They can be arranged in various forms, as seen in plan view, so as to vary the surface of the box 6 subjected to radiation from the glass bath 2. By way of example, the slabs 16 reduce the exposed surface of the box 6 to a lozenge-shaped region, so as to obtain a cooling action which decreases from the centre towards the walls of the duct.

Slabs 17 (FIGURE 1) of heat-insulating material advantageously line the lateral portions of the roof. These slabs, which taper towards the box 6, can cover all or part of the length of the roof. The length and width of the heat-insulated portion will be determined in accordance with the local conditions obtaining in each particular installation.

The cooling fluid is preferably air, and is introduced into the box 6 through the central pipe 7 and is discharged towards the exterior through lateral pipes 8.

It will be apparent that baffles may be arranged within the box in order to lengthen the path of travel of the cooling fluid.

Figures 3, 5:
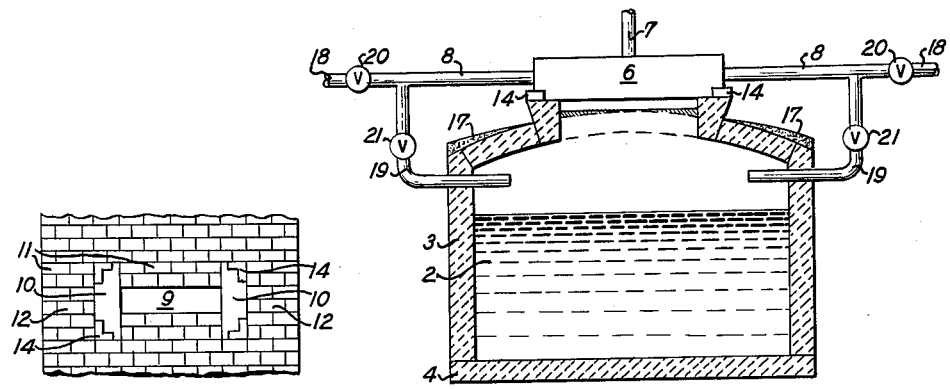
FIGURES 3 and 4 show details of the construction of the apparatus shown in FIGURES 1 and 2.
FIGURES 5 and 6 show variants of the apparatus shown in FIGURES 1 and 2.

By way of a varient, as illustrated in FIGURE 5, each of the discharge pipes 8 can be branched to form two pipes 18 and 19. The pipes 18 debouch into the free atmosphere whilst the branch pipes 19 debouch into the atmosphere of the duct 1. Valves 20 and 21 arranged in these pipes enable all or part of the air which has passed through the box to be discharged towards the outside or to be introduced into the duct. The possible introduction of air into the duct has the effect of creating in the atmosphere of the said duct a sufficient pressure to balance that which prevails in the melting furnace and thus to prevent sulphate or other vapours as well as very hot gases from moving from the melting furnace towards the working compartment.

Figure 6:
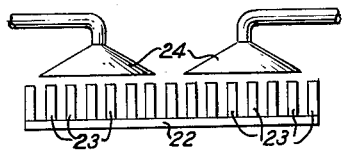

Instead of a box, according to a further feature of the invention it is also possible to use a part which is a good conductor of heat and is cooled by blowing air on to it. As illustrated in vertical sectional view in FIGURE 6, this part can comprise a plate 22 made of a heat-resistant material and provided with fine 23. Diffusers 24 arranged above the part blow jets of compressed air on to the said part.

Figure 7:
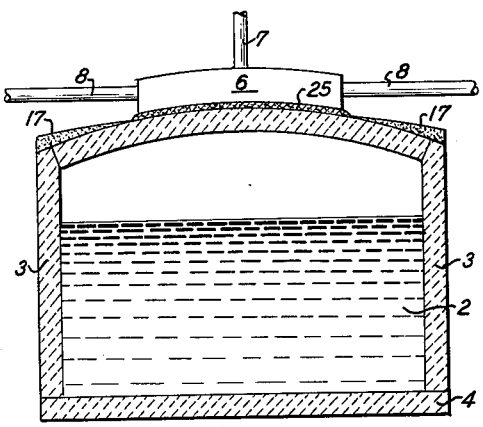
FIGURES 7 and 8 show two other forms of embodiment of the invention.

A further form of embodiment illustrated in FIGURE 7 consists in arranging the cooling element, for example the box 6, on the normal roof 5 of the duct. In this case, it is advantageous to give the undersurface of the cooling element a concave form corresponding to the curvature of the roof and to seal the said element on to the said roof by means of a cement 25 which is a good conductor of heat, in order to promote heat exchange between the roof and the cooling element. It is also advantageous in this case to use roof bricks of refractory material having good thermal conductivity for the portion of the roof covered by the box 6.

Figure 8:
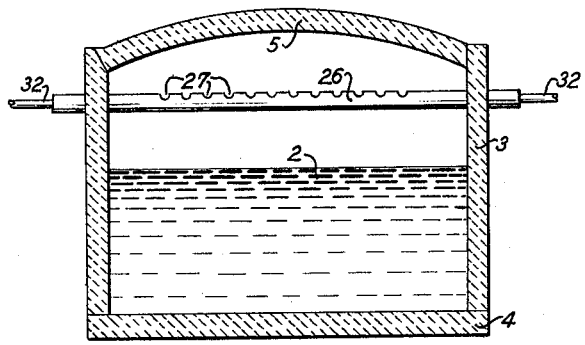
Figure 11:
FIGURES 11 to 13 show three positions of the same apparatus.
Figure 12:
Figure 13:

Finally, a last form of embodiment of the invention is shown by way of example in FIGURE 8. The cooling element 6 is replaced by a fixed distributing pipe 26 arranged across the upper portion of the duct and whose openings 27 are situated in the central portion of the roof 5 and are directed towards the said roof. The distributing pipe 26 is constituted of two concentric tubes 28 and 29 mounted with a sliding fit on one another and shown separately in plan in FIGURES 9 and 10. The external tube 28 which is fixed in the walls 3 of the duct comprises a series of openings 27 and is open at one of its ends 30, whereas the other end 31 is connected to a pipe 32 introducing the cooling fluid, air for example. The internal tube 29, open at its end 33 and closed at its end 34 comprises a longitudinal opening 35 which is triangular in form. The closed end 34 of the internal tube 29 carries a handle 36 which can be used to rotate the said tube in the external tube 28. Screws 37, fixed to the end of the wall of the external tube 28, prevent the internal tube 29 from being displaced longitudinally. It will be appreciated that the rotation of the tube 29 makes it possible to open gradually the openings 27 of the tube 28, starting from the centre. FIGURES 11 to 13 show by way of example three diffeernt relative positions of the tubes 28 and 29.

Figure 14:
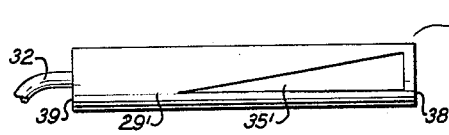
FIGURES 14 and 15 show two variants of the apparatus shown in FIGURE 8.
Figure 15:

It will also be appreciated that the difference in blowing effect varies in accordance with the apex angle of the triangle 35. Therefore, if required, the tube 29 can easily be replaced by another tube comprising an opening of a different shape. Moreover, in order to permit dissymmetrical regulation of the blowing effect, on either side of the axis of the roof, it is advantageous to construct the internal tube 29 in two sections 29' and 29" (FIGURE 14) each comprising a half 35' and 35" of the triangle. The internal end 38 of each of the tubes 29' and 29" is closed whereas the ends 39 are connected to the cooling fluid inlet 32.

Figure 9:
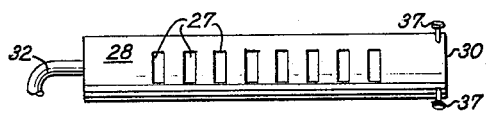
FIGURES 9 and 10 show details of the construction of the apparatus shown in FIGURE 8.
Figure 10:
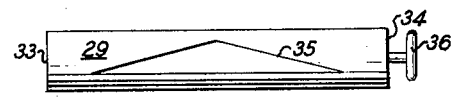

FIGURE 13 shows, by way of a variant of the apparatus shown in FIGURES 9 and 10, a different form for the openings. The external tube 28 comprises circular openings 40 whereas the internal tube 29 comprises rectangular openings 41 which are offset relatively to one another.

Electrical thermocouples 42 (FIGURE 1) arranged in the glass enable the temperature of the glass to be supervised in the centre of the duct and near the walls of the duct and enable the setting of the cooling element to be modified in accordance with the indications supplied by the said thermocouples.

It will be understood that, in accordance with local conditions, it may be advantageous to arrange a plurality of distributing pipes and/or a plurality of cooling elements transversely of the duct, and that the invention is not limited to the forms of embodiment which have been described and illustrated by way of example, and that modifications could be made thereto without departing from the scope of the said invention.

I claim:

1. The method of establishing a transverse uniformity in the temperature of molten glass flowing from the melting furnace to a working compartment, which comprises directing a cooling fluid at a place spaced from the surface of the flow of molten glass so as to transversely cool a portion only of the top covering spaced above such flow and to establish in such covering portion transversely over such flow, a transverse differential radiation control pattern which is the reverse of the transverse temperature gradient that tends to become established naturally in the glass flow in its travel from the melting furnace, and which exerts on the transverse portion of the glass flow spaced therebelow a maximum cooling action in the central portion of such transverse radiation pattern and a diminishing cooling action from such central portion towards the ends of such transverse radiation pattern.

2. The combination in a glass furnace having a duct which conducts the molten glass from the melting furnace to the working compartment and which is provided with a roof spaced from the surface of the molten glass flowing therethrough, of means for controlling the radiation of heat from a transverse portion of the stream of glass flowing through said duct to an overlying, spaced, transverse section of the roof of said duct to establish a transverse uniformity in the temperature of the molten glass passing under such transverse roof section, said heat radiation control means comprising means spaced from the molten glass for transversely cooling only such roof in said section extending transversely over such flow and so as to establish in such roof section itself a transverse differential radiation pattern which is the reverse of the transverse temperature gradient that tends to become established naturally in the glass flow in its travel from the melting furnace, and which exerts on said transverse portion of the glass flow spaced therebelow, a maximum cooling action in the central portion of said transverse radiation pattern and diminishing cooling action from such central portion towards the ends of said transverse radiation pattern.

3. The combination defined in claim 2, in which said heat radiation control means comprises elongated means mounted transversely of said duct on said transverse roof section thereof, said elongated means being constructed and arranged to provide on said roof section a radiant heat absorbing area defining said transverse differential radiation pattern and providing a transverse cooling chamber extending over such area, and means for introducing cooling fluid into said cooling chamber to effect said maximum and diminishing cooling actions in said transverse radiation pattern.

4. The combination defined in claim 2, in which said heat radiation control means comprises pipe means supported on the sides of said duct and extending transversely through the latter below said transverse roof section of the duct, said pipe means having a plurality of openings for directing cooling fluid against the underside of said transverse roof section to establish in the latter said transverse differential radiation pattern, said openings being of maximum size in the region of the central portion of said transverse radiation pattern, and being reduced in size towards the ends of said transverse radiation pattern, and means for supplying cooling fluid to said pipe means.

References Cited by the Examiner

UNITED STATES PATENTS

| | | | |
|---|---|---|---|
| 966,652 | 8/1910 | Colburn | 65—137 X |
| 1,554,268 | 9/1925 | Ferngren | 65—137 |
| 1,610,443 | 12/1926 | Gregorius | 65—204 |
| 1,631,204 | 6/1927 | Hitchcock | 65—137 X |
| 1,923,942 | 8/1933 | Lufkin | 65—137 |
| 2,144,973 | 1/1939 | Honiss | 65—137 |
| 2,422,640 | 6/1947 | Yamamoto | 65—204 |
| 2,964,879 | 12/1960 | Gibson | 65—355 |

DONALL H. SYLVESTER, *Primary Examiner.*

F. W. MIGA, *Assistant Examiner.*